2,804,476

PROCESS FOR SEPARATING TETRACYCLINE AND CHLORTETRACYCLINE

Virgil V. Bogert, Garden City, and Chester J. Walsh, Hollis, N. Y., assignors to Chas. Pfizer & Co., Inc., New York, N. Y., a corporation of Delaware No Drawing. Application April 14, 1954, Serial No. 423,247

4 Claims. (Cl. 260—559)

This invention relates to the separation of tetracycline from chlortetracycline, and more particularly, to the separation of tetracycline from chlortetracycline in fermentation broths and other aqueous solutions containing mixtures of the same.

Tetracycline is a broad spectrum antibiotic whose structure was first reported in the Journal of the American Chemical Society, vol. 74, p. 4976 (1952). The preparation of this antibiotic by catalytic reduction of chlortetracycline has also been reported (Journal of the American Chemical Society, vol. 74, p. 4621–23, 1953).

Chlortetracycline is also a broad spectrum antibiotic and can be recovered from the metabolism products of *Streptomyces aureofaciens*, as described in United States Patent No. 2,482,055 to Duggar, issued September 13, 1949 and referring to the antibiotic by its trademark "Aureomycin."

While it is possible to produce tetracycline by the catalytic reduction of chlortetracycline, its production by means of a direct fermentation process has many advantages. For example, the necessity for chemical processing equipment ordinarily required for the hydrogenation of chlortetracycline is eliminated. Furthermore, expensive hydrogenation catalyst is unnecessary and the dangers inherent in carrying out hydrogenation reactions are obviated. The production of tetracycline directly by fermentation methods has now been attained by cultivating selected strains of microorganisms of the genus Streptomyces in nutrient solutions under aerobic conditions. However, in most of the processes which have been developed, chlortetracycline is encountered in the fermentation broth along with the desired tetracycline. The proportion of chlortetracycline so encountered will vary considerably, depending upon the particular organism employed in the fermentation, and the composition of the fermentation medium, among other factors. When appreciable quantities are present, a serious problem of separation arises due to the similarities between the physical and chemical properties of the two antibiotics. Under these circumstances, conventional recovery procedures result in the production of mixtures of the two antibiotics, necessitating further treatment, such as catalytic reduction of the chlortetracycline, before pure tetracycline can be obtained.

A similar problem may be encountered in the catalytic reduction of chlortetracycline if the reduction is not complete, thereby resulting in the formation of mixtures of tetracycline and residual chlortetracycline. Thus the importance of providing a means for separating tetracycline from chlortetracycline can readily be appreciated.

It has now been found that tetracycline can be separated from chlortetracycline in fermentation broths or other aqueous solutions containing the two antibiotics, by extracting the antibiotics into a water immiscible organic solvent under acidic pH conditions and thereafter precipitating tetracycline from the solvent extract by neutralizing the same, leaving the chlortetracycline in the extract.

In accordance with the present invention, a mixture of tetracycline and chlortetracycline in aqueous solution is acidified to a pH of about 0.5 to 3.5, preferably about 2, with a suitable inorganic acid, such as hydrochloric acid, sulfuric acid, phosphoric acid and the like. The antibiotics may be in aqueous solution obtained from fermentation broth or they may be in the form of crude solids obtained from fermentation or other sources, which solids are suspended in water. They may also be in the form of their free bases, salts or complexes and the like, obtained through various recovery procedures well known in the art.

After acidification of the aqueous solution containing the antibiotics, various agents may be employed if desired to improve the quality of the final tetracycline product. Thus potassium ferrocyanide may be added to remove undesirable color-forming bodies and prevent their precipitation when the tetracycline is later separated. In addition, ammonium oxalate may be employed to prevent the subsequent precipitation of calcium salts, if the solution contains a particularly high content of calcium ions.

The acidified solution thus treated is then subjected to extraction with a water-immiscible organic solvent, particularly lower alcohols such as butanol, isobutanol, pentanols, hexanols and the like. Butanol has been found to be quite advantageous for this purpose. Usually about 0.2 to 2.0 volumes of the organic solvent per volume of aqueous solution are adequate to obtain the desired result, although higher volumes of solvent may be employed if desired.

It has been found that extraction of the two antibiotics into the organic solvent is greatly facilitated by treating the acidified aqueous solution with a water-soluble, inorganic salt, such as sodium chloride, sodium sulfate, potassium sulfate, potassium chloride, ammonium chloride, ammonium sulfate, etc. prior to the extraction. This appears to have a "salting out" effect on the two antibiotics and permits the use of much smaller volumes of the organic solvent than would otherwise be required for extraction purposes. The quantity of salt to be employed for this purpose may vary considerably, depending upon the combined antibiotic content of the aqueous solution and the concentration of the antibiotics therein. However, an amount of the salt sufficient to form a concentration from about 3.0 to 25.0% in the treated mixture is generally sufficient for most purposes.

Upon completion of the extraction, the organic solvent extracts are preferably filtered to remove insoluble materials, and then treated with water and an alkaline material to adjust the mixture to substantially neutral conditions. Examples of suitable alkaline materials are sodium hydroxide, potassium hydroxide, ammonium hydroxide, triethylamine and a variety of other aliphatic amines. This is readily accomplished by mixing water with the solvent extract and gradually adding the alkaline material until the pH of the aqueous layer remains between about 5 and 8, preferably between 6 and 7. Thereafter, tetracycline in the form of the base may be precipitated by a number of different procedures. For example, the mixture of water and organic solvent may be agitated or simply permitted to stand for a period of time, say from 8 to 12 hours, during which the tetracycline free base crystallizes out. Alternatively, the mixture may be concentrated in vacuo to completely or partially remove the organic solvent, leaving sufficient water in the concentrate at all times to form the trihydrate of tetracycline. The tetracycline crystallized by these procedures is readily recovered by filtration or other suitable means and may be further purified by recrystallization from acetone, mono ethers of ethylene glycol or other organic solvents if desired.

The chlortetracycline present in the original extract is retained in the solution or filtrate remaining after removal of the tetracycline. This filtrate may be further treated as above outlined to separate and recover additional tetracycline from any that may remain in the filtrate with the chlortetracycline. The chlortetracycline may then be recovered by evaporating the reworked material to dryness or by subjecting the same to various purification procedures well known in the art.

It will be appreciated that the precipitation of tetracycline by the process described is particularly unexpected in view of the similarities between the physical and chemical properties of tetracycline and chlortetracycline. For example, both form salts with acids and in such form are readily extracted by organic solvents upon acidification of aqueous solutions containing the two antibiotics. Furthermore, both of their acid salts are readily neutralized to yield the free bases upon the addition of an alkaline material. Yet the neutralized tetracycline readily precipitates from solution, whereas the chlortetracycline remains in the solution under the conditions described.

The invention is further illustrated by the following examples, which are not to be considered as the only manner in which it may be employed.

Example I

A selected strain of Streptomyces, deposited with the American Type Culture Collection, Washington, D. C. under ATCC No. 11654 was cultivated on agar under controlled conditions to develop spores for the purpose of seeding a nutrient medium of the following composition:

|  | Gms./l. |
| --- | --- |
| Enzymine B | 10 |
| Cerelose | 10 |
| Yeast extract | 5 |
| Calcium carbonate | 1 |

This mixture of nutrients was diluted to a volume of 1 l. with water, adjusted to a pH of 6.7, and subjected to heat sterilization. Thereafter, the medium was cooled and the spores were added under aseptic conditions. After cultivation of the organism in shaken flasks for two days, the mixture of broth and mycelium thus formed was transferred to 25 gallons of a sterile fermentation medium having the following composition:

| Soybean meal | percent | 4.0 |
| --- | --- | --- |
| Sodium nitrate | percent | 0.5 |
| Soybean oil | cc./l. | 5 |

This medium was adjusted to pH 6.25 and sterilized in the usual manner before transferring the broth and mycelium thereto from the shaken flasks. The medium was then seeded with the organism and subjected to agitation and aeration under sterile conditions for 26 hours at the rate of 1 volume of air per volume of broth per minute. The temperature during this period was maintained at 28° C.

The 25 gallons of of inoculum thus prepared was next transferred to 150 gallons of medium having the same composition and sterilized as previously indicated. The fermentation was also conducted under sterile conditions, employing ¾ volume of air per volume of broth per minute at a temperature of 28° C. for a period of 67 hours. The potency of the broth at this point was found to be 715 mcg./ml.

The 108 gallons on the fermentation broth thus prepared were acidified to a pH of 2.5 to 3 with sulfuric acid and filtered with the aid of supercel to remove the mycelium. After washing the cake with water, 0.4% w./v. of citric acid was added to the filtered broth, followed by the addition of 2.3 ml./l. of a 50% by weight solution in isopropanol of long chain alkyl quaternary amines sold under the trade mark "Arquad C." This material consists of a technical mixture averaging 47% dodecyl trimethyl ammonium chloride together with 8% octyl-, 9% decyl-, 18% tetradecyl-, 8% hexadecyl-, 5% octadecyl-, and 5% octadecenyl-trimethyl ammonium chlorides. Thereafter, 6 ml. of 3% w./v. calcium chloride solution were added per liter of broth and the pH was adjusted to about 9 to 9.5 with caustic soda to precipitate the quaternary ammonium salts of tetracycline and chlortetracycline. These precipitated salts were filtered with the aid of supercel, washed with water and dried.

Fifty grams of the above mixed salts, containing about 30,000 mcg. of total antibiotic activity per gram, were suspended in 200 ml. of water and the pH was adjusted to 2 with 6 N. hydrochloric acid. Two grams of potassium ferrocyanide and 25 ml. of 5% ammonium oxalate solution were then added and the mixture was stirred for fifteen minutes, followed by readjustment of the pH to 2. The mixture was filtered and the filter cake was washed with 100 ml. of water, also adjusted to a pH of 2. This was combined with the filtrate to make 305 ml. of solution containing a total antibiotic activity of 1,690,000 mcg. The resulting solution was then extracted six times with 100 ml. portions of n-butanol, leaving 217 ml. of extracted aqueous layer containing 211,000 mcg. of total antibiotic activity, or 12.4% of the total antibiotic activity of the original solution.

The butanol extracts were filtered, combined and shaken with 100 ml. of water, and 10% sodium hydroxide solution was slowly added until the pH of the aqueous layer remained between 6 and 7. The mixture of butanol and water was then concentrated in vacuo, while adding additional water to facilitate removal of the butanol. This resulted in about 80 to 100 ml. of an aqueous solution containing crystals of free tetracycline base. The solution thus obtained was readjusted to a pH of between 5 and 6.8 with additional 10% sodium hydroxide solution, after which it was cooled and filtered. The resulting aqueous filtrate was found to contain 374,000 mcg. of total antibiotic activity, or 22.1% of the total antibiotic activity of the original solution. The crystals weighed 0.89 gram, assaying at 882,000 mcg. total tetracycline activity or 990 mcg. of tetracycline activity per mg. This corresponded to approximately 52% of the total antibiotic activity of the original aqueous solution, indicating that a substantial portion of the tetracycline present in that solution was recovered therefrom. Ultraviolet analysis and paper chromatography measurements demonstrated that only tetracycline was present in the crystalline product. Analysis of the product follows:

Calcd: for $C_{22}H_{24}N_2O_8$: C, 59.45; H, 5.44. Found: C, 59.59; H, 5.44.

The above procedure was repeated with mixture of tetracycline and chlortetracycline quaternary ammonium salts, omitting the butanol extraction described therein. This resulted in a crude tetracycline product containing 30% by weight of chlortetracycline.

Example II

Five hundred grams of the combined quaternary ammonium salts of tetracycline and chlortetracycline (of Example I) were suspended in 1500 mg. of water at pH 2 and 20 grams of sodium ferrocyanide were added. The resulting solution was then filtered and washed with 1000 ml. of pH 2 water. The filtrate combined with the wash water contained 61,100,000 mcg. of total antibiotic activity. This solution was next treated with 340 grams of sodium chloride, followed by three extractions with 800 ml. portions of n-butanol. The spent aqueous solution contained 870,000 mcg. of total antibiotic activity or 1.4% of the total activity of the original solution before extraction. The butanol extracts were combined, shaken with water, and neutralized with 10% sodium hydroxide until the pH of the aqueous layer was 6.8. Thereafter the butanol was partially removed in vacuo and the mixture was permitted to stand over night under refrigeration. This resulted in the crystallization of the free tetracycline base which was removed from the solution by filtration and dried in vacuo. The product thus obtained weighed 22.1 grams and assayed at 1047 mcg./mg., having a total tetracycline activity of 23,100,000 mcg. or 37.7% of the total antibiotic activity of the original solution. The crystalline product contained no chlortetracycline.

The remaining butanol in the filtrate was removed in vacuo and 5.9 grams of additional tetracycline were obtained, assaying at 950 mcg./mg. The total activity of this additional tetracycline was 5,610,000 mcg., representing 9.2% of the total antibiotic activity of the original solution. On the other hand, the combined filtrates contained 28,500,000 mcg. of activity, of which 30 to 40% was chlortetracycline. By repeating the above procedure, additional tetracycline is obtained from the mother liquors, permitting recovery of the chlortetracycline therefrom by known recovery methods, as by solvent extraction with butanol.

Resort may be had to such modifications and equivalents as fall within the spirit of the invention and the scope of the appended claims.

What is claimed is:

1. A process for separating tetracycline from aqueous solutions containing the same and appreciable quantities of chlortetracycline, which comprises adjusting the said solution to a pH between about 0.5 and 3.5, extracting the two antibiotics into a water-immiscible lower alcohol, selected from the class consisting of butanols, pentanols and hexanols, separating the resulting extract, washing the said extract with water while adjusting the pH of the aqueous phase to a pH between about 5 and 8, whereby tetracycline crystals are precipitated.

2. The process of claim 1, wherein the precipitation of tetracycline is accelerated by concentrating to remove at least part of the lower alcohol and thereafter cooling the remaining concentrate.

3. The process of claim 1, wherein the lower alcohol is butanol.

4. A process for separating tetracycline from aqueous solutions containing the same and appreciable quantities of chlortetracycline, which comprises adjusting the said solution to a pH between about 0.5 and 3.5 with hydrochloric acid, extracting the two antibiotics into butanol in the presence of an added water-soluble inorganic salt, selected from the class consisting of sodium, potassium and ammonium chlorides and sodium, potassium and ammonium sulfates, separating the resulting extract, washing the said extract with water and adjusting the pH of the aqueous phase to between about 5 and 8 with sodium hydroxide, whereby tetracycline crystals are precipitated.

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,658,078 | Blase | Nov. 3, 1953 |
| 2,671,806 | Winterbottom et al. | Mar. 9, 1954 |
| 2,699,054 | Conover | Jan. 11, 1955 |
| 2,734,018 | Minieri et al. | Feb. 7, 1956 |